United States Patent
Jaatinen

(10) Patent No.: US 10,944,577 B2
(45) Date of Patent: Mar. 9, 2021

(54) CERTIFICATE VERIFICATION

(71) Applicant: Nokia Technologies Oy, Espoo (FI)

(72) Inventor: Jussi Jaatinen, Helsinki (FI)

(73) Assignee: Nokia Technologies Oy, Espoo, FL (US)

( * ) Notice: Subject to any disclaimer, the term of this patent is extended or adjusted under 35 U.S.C. 154(b) by 206 days.

(21) Appl. No.: 15/566,741

(22) PCT Filed: Apr. 21, 2015

(86) PCT No.: PCT/FI2015/050273
§ 371 (c)(1),
(2) Date: Oct. 16, 2017

(87) PCT Pub. No.: WO2016/170222
PCT Pub. Date: Oct. 27, 2016

(65) Prior Publication Data
US 2018/0139059 A1    May 17, 2018

(51) Int. Cl.
*H04L 29/06* (2006.01)
*H04L 9/32* (2006.01)
(Continued)

(52) U.S. Cl.
CPC .......... *H04L 9/3268* (2013.01); *H04L 9/3247* (2013.01); *H04L 63/0823* (2013.01);
(Continued)

(58) Field of Classification Search
CPC ............. H04L 63/0823; H04L 63/1466; H04L 63/166; H04L 63/18; H04L 63/164;
(Continued)

(56) References Cited

U.S. PATENT DOCUMENTS 7,111,162 B1 * 9/2006 Bagepalli ............ H04L 63/0428
709/227
7,392,375 B2   6/2008 Bartram et al.
(Continued)

FOREIGN PATENT DOCUMENTS

FI         20135408 A      10/2014
KR      2013-0057678 A      6/2013
(Continued)

OTHER PUBLICATIONS

"How to Detect the NSA MITM Attack on SSL?", Stack Exchange, Retrieved on Sep. 14, 2017, Webpage available at : https://security.stackexchange.com/questions/42406/how-to-detect-the-nsa-mitm-attack-on-ssl.

(Continued)

*Primary Examiner* — Sher A Khan
(74) *Attorney, Agent, or Firm* — Laine IP Oy

(57) ABSTRACT

According to an example aspect, there is provided an apparatus configured to participate in establishment of a secured protocol connection, receive over a first interface a certificate in connection with the establishment of the secured protocol connection, receive, in connection with the establishment of the secured protocol connection, over a second interface, information concerning the certificate, and compare the certificate to the information concerning the certificate.

14 Claims, 6 Drawing Sheets

(51) Int. Cl.
*H04W 12/06* (2021.01)
*H04W 12/12* (2021.01)
*H04W 4/80* (2018.01)
*H04L 29/08* (2006.01)

(52) U.S. Cl.
CPC ........ *H04L 63/1466* (2013.01); *H04L 63/166* (2013.01); *H04L 63/18* (2013.01); *H04W 12/0609* (2019.01); *H04W 12/1208* (2019.01); *H04L 63/164* (2013.01); *H04L 69/326* (2013.01); *H04W 4/80* (2018.02)

(58) Field of Classification Search
CPC ..... H04L 9/3268; H04L 9/3247; H04L 12/06; H04L 12/12; H04W 4/80
See application file for complete search history.

(56) References Cited

U.S. PATENT DOCUMENTS

| | | | |
|---|---|---|---|
| 7,848,940 B1* | 12/2010 | Harniman | G06Q 10/02 705/1.1 |
| 8,561,181 B1 | 10/2013 | Hernacki et al. | |
| 8,677,466 B1* | 3/2014 | Chuang | H04L 9/321 709/229 |
| 9,077,546 B1* | 7/2015 | Rakshit | H04L 9/3265 |
| 9,112,854 B1* | 8/2015 | Bhimanaik | H04L 63/126 |
| 9,143,504 B1* | 9/2015 | Shi | H04L 63/0823 |
| 2003/0177348 A1 | 9/2003 | Davies et al. | |
| 2003/0235194 A1 | 12/2003 | Morrison | |
| 2004/0264379 A1* | 12/2004 | Srikrishna | H04L 45/00 370/238 |
| 2007/0136800 A1* | 6/2007 | Chan | H04L 9/3236 726/10 |
| 2010/0058064 A1* | 3/2010 | Kirovski | H04L 9/3073 713/176 |
| 2010/0318848 A1* | 12/2010 | Yang | G01R 31/31713 714/30 |
| 2011/0314289 A1* | 12/2011 | Horn | H04L 63/06 713/175 |
| 2012/0185886 A1* | 7/2012 | Charania | H04N 21/4312 725/2 |
| 2012/0240204 A1 | 9/2012 | Bhatnagar et al. | |
| 2013/0145151 A1* | 6/2013 | Brown | H04L 9/3268 713/156 |
| 2013/0166907 A1* | 6/2013 | Brown | H04L 9/3265 713/156 |
| 2013/0219473 A1* | 8/2013 | Schaefer | G06F 21/335 726/4 |
| 2013/0282903 A1* | 10/2013 | DeLuca | H04W 12/003 709/225 |
| 2014/0067996 A1* | 3/2014 | Zhang | H04L 63/0428 709/217 |
| 2014/0189809 A1 | 7/2014 | Koved et al. | |
| 2014/0237582 A1 | 8/2014 | Niemela | |
| 2014/0283054 A1 | 9/2014 | Janjua et al. | |
| 2014/0298415 A1* | 10/2014 | Xie | H04L 61/2589 726/3 |
| 2015/0365286 A1 | 12/2015 | Folco et al. | |
| 2016/0174107 A1* | 6/2016 | Kanugovi | H04L 12/28 370/236 |
| 2016/0219043 A1* | 7/2016 | Blanke | H04L 9/3263 |
| 2018/0139059 A1* | 5/2018 | Jaatinen | H04W 12/12 |

FOREIGN PATENT DOCUMENTS

| | | | | |
|---|---|---|---|---|
| KR | 20130057678 A | * | 6/2013 | ............ H04L 9/32 |
| KR | 101316059 B1 | | 10/2013 | |
| WO | 2008/100757 A2 | | 8/2008 | |

OTHER PUBLICATIONS

"Certificate Pinning", Wikipedia, Retrieved on Sep. 14, 2017, Webpage available at : https://en.wikipedia.org/wiki/Transport_Layer_Security#Certificate_pinning.
Dacosta et al., "Trust No One Else: Detecting MITM Attacks Against SSL/TLS Without Third-Parties", European Symposium on Research in Computer Security, 2012, 18 pages.
"Does Https Prevent Man in the Middle Attacks by Proxy Server", Stack Exchange, Retrieved on Sep. 14, 2017, Webpage available at : https://security.stackexchange.com/questions/8145/does-https-prevent-man-in-the-middle-attacks-by-proxy-server.
Deng et al., "Defending Against Redirect Attacks in Mobile IP", Proceedings of the 9th ACM conference on Computer and communications security, Nov. 18-22, 2002, 9 pages.
"Transport Layer Protection Cheat Sheet", OWASP, Retrieved on Sep. 14, 2017, Webpage available at : https://www.owasp.org/index_php/Transport_Layer_Protection_Cheat_Sheet.
International Search Report and Written Opinion received for corresponding Patent Cooperation Treaty Application No. PCT/FI2015/050273, dated Aug. 31, 2015, 15 pages.
Braun, "Ubiquitous Support of Multi Path Probing:Preventing Man in the Middle Attacks on Internet Communication", IEEE Conference on Communications and Network Security, Oct. 29-31, 2014, pp. 510-511.
Lark et al., "SoK: SSL and HTTPS: Revisiting Past Challenges and Evaluating Certificate Trust Model Enhancements", IEEE Symposium on Security and Privacy, May 19-22, 2013, pp. 511-525.
Extended European Search Report received for corresponding European Patent Application No. 15889784.3, dated Nov. 20, 2018, 9 pages.

* cited by examiner

CERTIFICATE VERIFICATION

RELATED APPLICATION

This application was originally filed as PCT Application No. PCT/FI2015/050273 filed Apr. 21, 2015.

FIELD

The present invention relates to the field of communication security.

BACKGROUND

Eavesdropping on electronic communications poses a risk to confidentiality of information communicated using communication networks. To prevent unauthorized access to confidential information, such as documents or telephone discussions, use of unsecured networks may be avoided with communicating confidential information.

Using only secured networks, by which it is meant networks that are inaccessible to potential eavesdroppers, may be difficult. For example, separate secured networks may not be available, or their use or implementation may be difficult, slow or expensive.

Encryption may be employed when communicating over an unsecure network. Symmetric encryption keys may be exchanged beforehand, such that the symmetric keys may be used to convert plaintext contents into ciphertext. By transmitting the ciphertext, but not the plaintext, over an unsecure network, confidentiality of the contents may be preserved, since encryption algorithms are designed in such a way that obtaining the plaintext from the ciphertext without the encryption key is very difficult. An example of a symmetric encryption algorithm is the Blowfish algorithm.

Exchanging symmetric encryption keys beforehand may take place out of band, by which it is meant the encryption keys are not communicated over the unsecure network. The encryption keys may be exchanged via paper mail, messenger, diplomatic pouch or other suitable methods.

Out of band encryption key exchange is not needed when using public key encryption, where encryption is possible using a public key, which need not be kept secret and can be communicated over unsecured networks. Ciphertext produced with a public key, however, cannot be decrypted to obtain the plaintext by using the public key, rather, a separate private key is needed, the private key being guarded by the recipient and not communicated over unsecured connections. In some communication protocols, public key encryption is used to communicate a symmetric encryption key that is subsequently used in securing a protocol connection.

Transport layer security, TLS, is a cryptographic protocol for Internet communication. TLS employs cryptographic certificates and public key cryptography to cause a shared secret to be established between communicating nodes, the shared secret subsequently enabling use of symmetric encryption to secure the protocol connection.

SUMMARY OF THE INVENTION

The invention is defined by the features of the independent claims. Some specific embodiments are defined in the dependent claims.

According to a first aspect of the present invention, there is provided an apparatus comprising at least one processing core, at least one memory including computer program code, the at least one memory and the computer program code being configured to, with the at least one processing core, cause the apparatus at least to participate in establishment of a secured protocol connection, receive over a first interface a certificate in connection with the establishment of the secured protocol connection, receive, in connection with the establishment of the secured protocol connection, over a second interface, information concerning the certificate, and compare the certificate to the information concerning the certificate.

Various embodiments of the first aspect may comprise at least one feature from the following bulleted list:
- the at least one memory and the computer program code are configured to, with the at least one processing core, cause the apparatus to participate in the establishment of the secured protocol connection by receiving and transmitting messages over the first interface
- the first interface comprises an internet protocol connection with a correspondent node, the first interface traversing a first transceiver, the secured protocol connection being established between the apparatus and the correspondent node
- the second interface comprises a connection with a network access device, the second interface traversing a second transceiver
- the second interface comprises a packet based connection with a network access device, the second interface traversing the first transceiver
- the packet based connection with the network access device is secured with a shared secret
- the at least one memory and the computer program code are configured to, with the at least one processing core, cause the apparatus to receive the shared secret as input from a user
- the secured protocol connection comprises a transport layer security connection
- the at least one memory and the computer program code are configured to, with the at least one processing core, cause the apparatus to verify a cryptographic signature of at least one of the certificate and the information concerning the certificate
- the apparatus is configured to complete the establishment of the secured protocol connection at least in part as a response to a determination that the information concerning the certificate is consistent with the certificate
- the apparatus is configured to participate in establishing the secured protocol connection over the second interface responsive to the information concerning the certificate being determined to be inconsistent with the certificate.

According to a second aspect of the present invention, there is provided an apparatus comprising at least one processing core, at least one memory including computer program code, the at least one memory and the computer program code being configured to, with the at least one processing core, cause the apparatus at least to relay messages between a first node and a second node, the messages relating to establishment of a secured protocol connection, receive, in connection with the establishment of the secured protocol connection, a certificate from the second node, and provide the certificate to the first node over a first interface and over a second interface.

Various embodiments of the second aspect may comprise at least one feature from the following bulleted list:
- the apparatus is configured to provide network access to the first node
- the first interface comprises a leg of an internet protocol connection between the first node and the second node the the second interface comprises a short range radio interface with the first node the second interface comprises a packet based connection with the first node, the apparatus being an endpoint of the packet based connection with the first node the secured protocol connection comprises a transport layer security connection.

According to a third aspect of the present invention, there is provided a method comprising participating, by an apparatus, in establishment of a secured protocol connection, receiving over a first interface a certificate in connection with the establishment of the secured protocol connection, receiving, in connection with the establishment of the secured protocol connection, over a second interface, information concerning the certificate, and comparing the certificate to the information concerning the certificate.

Various embodiments of the third aspect may comprise at least one feature corresponding to a feature from the preceding bulleted list laid out in connection with the first aspect.

According to a fourth aspect of the present invention, there is provided a method comprising relaying, by an apparatus, messages between a first node and a second node, the messages relating to establishment of a secured protocol connection, receiving, in connection with the establishment of the secured protocol connection, a certificate from the second node, and providing, from the apparatus, the certificate to the first node over a first interface and over a second interface.

Various embodiments of the fourth aspect may comprise at least one feature corresponding to a feature from the preceding bulleted list laid out in connection with the second aspect.

According to a fifth aspect of the present invention, there is provided an apparatus comprising means for participating in establishment of a secured protocol connection, means for receiving over a first interface a certificate in connection with the establishment of the secured protocol connection, means for receiving, in connection with the establishment of the secured protocol connection, over a second interface, information concerning the certificate, and means for comparing the certificate to the information concerning the certificate.

According to a sixth aspect of the present invention, there is provided an apparatus comprising means for relaying messages between a first node and a second node, the messages relating to establishment of a secured protocol connection, means for receiving, in connection with the establishment of the secured protocol connection, a certificate from the second node, and means for providing, from the apparatus, the certificate to the first node over a first interface and over a second interface.

According to a seventh aspect of the present invention, there is provided a non-transitory computer readable medium having stored thereon a set of computer readable instructions that, when executed by at least one processor, cause an apparatus to at least participate in establishment of a secured protocol connection, receive over a first interface a certificate in connection with the establishment of the secured protocol connection, receive, in connection with the establishment of the secured protocol connection, over a second interface, information concerning the certificate, and compare the certificate to the information concerning the certificate.

According to an eighth aspect of the present invention, there is provided a non-transitory computer readable medium having stored thereon a set of computer readable instructions that, when executed by at least one processor, cause an apparatus to at least relay messages between a first node and a second node, the messages relating to establishment of a secured protocol connection, receive, in connection with the establishment of the secured protocol connection, a certificate from the second node, and provide the certificate to the first node over a first interface and over a second interface.

According to a ninth aspect of the present invention, there is provided a computer program configured to cause a method in accordance with at least one the second and third aspects to be performed.

EMBODIMENTS

By obtaining a second copy of a cryptographic certificate via a second interface, it may be discovered if a man-in-the-middle, MITM, attack is ongoing with respect to a first interface in a computing device of a user, when a secured protocol connection, such as a TLS connection, is being established.

Figure 1:
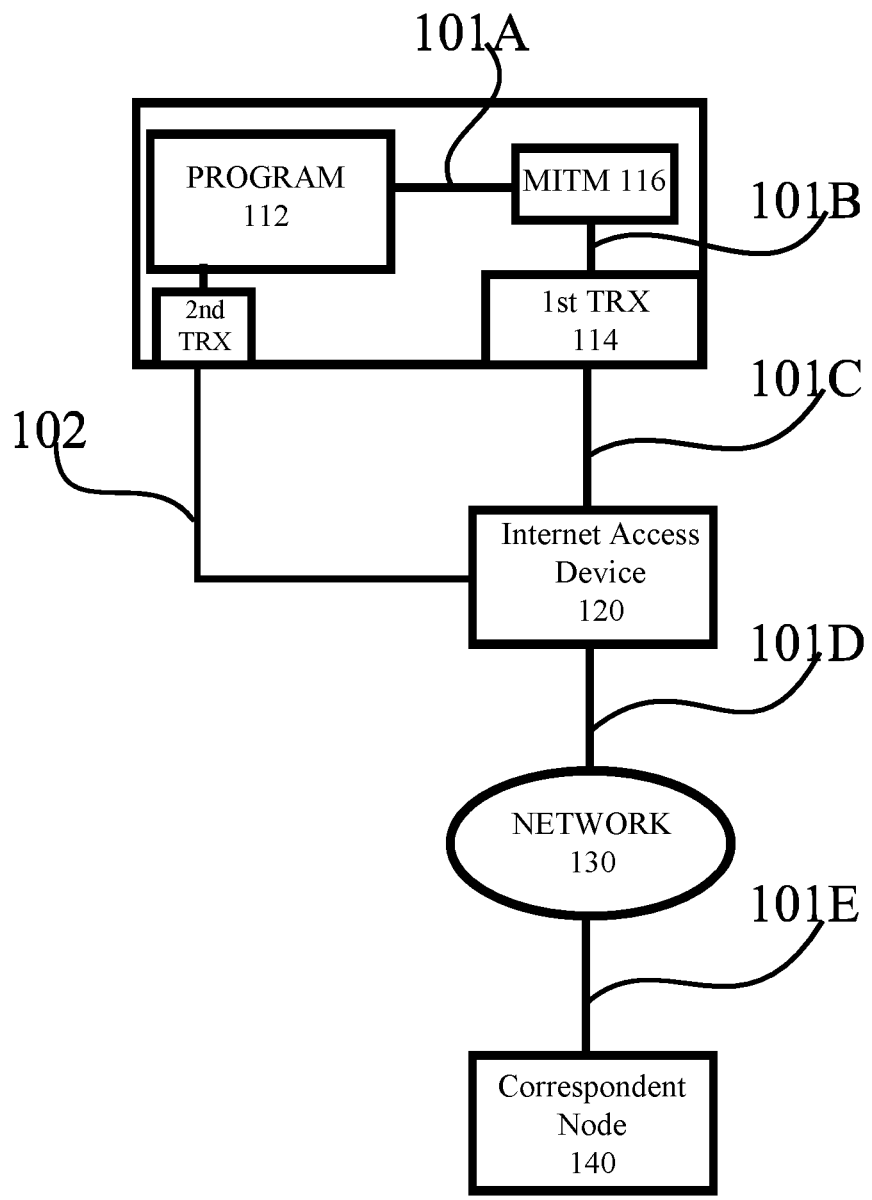
FIG. 1 illustrates a first system in accordance with at least some embodiments of the present invention.

FIG. 1 illustrates a first system in accordance with at least some embodiments of the present invention. The system of FIG. 1 comprises device 110, which may comprise a user device, such as, for example, a laptop computer, desktop computer, tablet computer or other kind of computer, smartphone, or other kind of suitable computing device. Device 110 of FIG. 1 comprises a first transceiver 114 and a second transceiver 118. First transceiver 114 may comprise, for example, an Ethernet port, wireless local area network, WLAN, which is also known as Wi-Fi, transceiver, or another kind of suitable port or transceiver. Second transceiver 118 may comprise a communication transceiver, such as, for example, a wire-line or wireless transceiver. For example, second transceiver 118 may comprise a low-power wireless interface, or an Ethernet interface. Examples of low-power wireless interfaces include Bluetooth, Wibree, ZigBee and infrared interfaces.

Running in device 110 is program 112, which may comprise a browser, for example. A browser may comprise a program configured to retrieve, over the world wide web, pages that are then rendered, or displayed, to a user. Other examples of program 112 include a network banking application, a messaging application and a telephonic application that enables voice communication between two parties. Such voice communication may be packet-based, for example.

Program 112 may be configured to initiate a secured protocol connection with correspondent node 140. A secured protocol connection may comprise a transport layer security, TLS, connection, for example. TLS is specified by the Internet Engineering Task Force, IETF, and exists in versions 1.0, 1.1 and 1.2. In general a secured protocol connection may comprise any protocol connection that uses at least one cryptographic certificate to verify at least one identity of a node. Alternatively to TLS, the secured protocol connection may comprise a secure sockets layer, SSL, connection, for example. Program 112 may be configured to use a default networking option Establishing the secured protocol connection may take place over a first interface, such as, for example, an internet protocol, IP, connection. An IP connection between device 110 and correspondent node 140 is illustrated in FIG. 1 as comprising legs 101C, 101D and 101E. Further, inside device 110, legs 101B and 101A convey information between program 112 and correspondent node 140. In detail, leg 101C connects device 110 to internet access device 120. Internet access device 120 may comprise a WLAN base station, Ethernet router or another access device configured to provide internet connectivity to device 110. Leg 101D connects internet access device 120 to network 130. Network 130 may comprise the Internet, at least in part, and/or a corporate network. Leg 101E connects correspondent node 140 to network 130. Leg 101A is comprised in the first interface that program 112 has. Internet access device 120 may be configured to relay packets comprised in a packet connection between device 110 and correspondent node 140 without functioning as an endpoint in the packet connection, for example.

Program 112 may initiate the establishment of the secured protocol connection by transmitting, over the first interface, an initial packet to correspondent node 140. An example of an initial packet is a ClientHello packet in a TLS handshake. In connection with an establishment procedure, such as a handshake, triggered by the initial packet, correspondent node 140 may transmit to device 110 a cryptographic certificate of correspondent node 140. In some embodiments, it is correspondent node 140, rather than program 112, that initiates the establishment of the secured protocol connection. A cryptographic certificate of correspondent node 140 may comprise at least one of the following: a public key, a cryptographic signature, an identifier of a cryptographic signature algorithm, an identifier of correspondent node 140 and an identifier of a party operating correspondent node 140. Once program 112 has the cryptographic certificate, it may verify the signature on the certificate is valid. The signature may be applied, for example, by a signing authority that is known to program 112. Program 112 may have a public key of the signing authority, or access to such a key, that program 112 may use in verifying the cryptographic signature of the certificate.

In case the signature is valid, program 112 may trust that the certificate is from correspondent node 140 and has not been tampered with, for example during transit over the first interface, that is, legs 101E, 101D, 101C or inside device 110 itself. Program 112 may be configured to use the public key in the certificate to transmit to correspondent node 140 information encrypted with this public key, which can only be decrypted by correspondent node 140 which possesses the corresponding private key. Program 112 may be configured to generate the information, before encrypting it with the public key, using a random number generator, for example. This information may be used as a symmetric encryption key on the secured protocol connection between program 112 and correspondent node 140, or it may be used in generating such a symmetric encryption key. In general, a symmetric encryption key is an encryption key that is used with a symmetric encryption algorithm, such that the same key can be used to encrypt and to decrypt. In general, the information program 112 sends to correspondent node 140, encrypted with the public key from the certificate received from correspondent node 140, may be used to establish, at least in part, the secured protocol connection.

Once the secured protocol connection is established, it may be used to communicate in an end to end encrypted fashion such that only program 112 and correspondent node 140 have the encryption key needed to access the contents of this communication.

A risk in establishing a secured protocol connection as described above is a man-in-the-middle attack, also known by the acronym MITM. In the system of FIG. 1, device 110 comprises a MITM element 116, which may be installed therein by a manufacturer of device 110, or it may be installed therein after manufacture without the knowledge of the user of device 110. MITM element 116 may be comprised in first transceiver 114, or it may be distinct from first transceiver 114. MITM element 116 may be configured to monitor connections between program 112 and first transceiver 114, and responsive to a determination that a secured protocol connection establishment is ongoing between program 112 and a correspondent node, MITM element 116 may be configured to intercept the message from the correspondent node that comprises the cryptographic certificate. MITM element 116 may then generate a new forged certificate, which comprises a forged public key. MITM element 116 may sign this forged certificate with a private key of MITM element 116 itself, such that a public key corresponding to this private key has been included in a list of trusted signing authority public keys that program 112 uses to verify incoming cryptographic certificates. An example of a list of trusted signing authority public keys is a Windows certificate store.

MITM element 116 may then provide the forged and signed cryptographic certificate to program 112, such that program 112 will handle the forged certificate the same way it would handle the genuine certificate, which MITM element 116 has stored but not provided to program 112. Program 112 may reply toward correspondent node 140 with a message comprising information encrypted with the forged public key. MITM element 116 may then intercept this message, decrypt the encrypted information therein with the private key of MITM element 116 and establish a secured protocol connection between MITM element 116 and program 112. MITM element 116 may also complete the establishment of the secured protocol connection with correspondent node 140 without informing program 112. As a result, instead of one secured protocol connection there will be two secured protocol connections, a first one between program 112 and MITM element 116, and a second one between MITM element 116 and correspondent node 140. MITM element 116 may relay packets between the secured protocol connections, such that program 112 and correspondent node 140 may both believe they are communicating directly with each other. However, in reality all information exchanged between program 112 and correspondent node 140 is decrypted in MITM element 116, and re-encrypted before sending to the intended recipient. Such a man-in-the-middle attack provides MITM element 116 access to the encrypted information exchanged between program 112 and correspondent node 140, severely undermining the confidentiality of this protocol connection.

Program 112 will verify the forged certificate as valid, since MITM element 116 has a private key to use in signing the forged certificate that corresponds to a public key that program 112 thinks is a valid signing key. The delay MITM element 116 causes in generating the forged certificate is unlikely to be noticed by program 112, since there exist end-to-end delays in networks anyway.

Internet access device 120 may be configured to monitor connections between device 110 and network 130, and responsive to a determination that a secured protocol connection establishment is ongoing between program 112 and a correspondent node, Internet access device 120 may be configured to store a copy of the message from the correspondent node that comprises the cryptographic certificate. Program 112 may, for example via second transceiver 118, alert internet access device 120 that program 112 is about to initiate, or just has initiated, establishment of a secured protocol connection.

Internet access device 120 may provide to program 112, via connection 102 it has with second transceiver 118, a copy of the cryptographic certificate it received from the correspondent node. This copy of the certificate is provided from second transceiver 118 to program 112 over a second interface of program 112. The second interface in the system of FIG. 1 connects program 112 to internet access device 120 via second transceiver 118. Program 112 may compare this copy received over the second interface to the copy it receives over the first interface, that is, the interface it is using to establish the secured protocol connection. In case a MITM element 116 disposed between Internet access device 120 and program 112 is active, program 112 may detect its presence since the forged certificate provided to program 112 by MITM element 116 is different from the copy of the genuine certificate program 112 receives via the second interface. Thus program 112 may alert the user or abort the establishment of the secured protocol connection, for example.

A connection between program 112 and internet access device 120 may be secured. For example, the internet access device may have a display configured to display a code, such as a numeric or alphanumeric code, which the user can read and provide to program 112 via a user interface. Alternatively to a display, a sticker may be placed on Internet access device 120 that has a code printed thereon. As a yet further alternative, a serial number of internet access device 120 may be used as the code. This code can be used to secure the connection, for example by using the code as a symmetric encryption key in communication between program 112 and internet access device 120. Alternatively, the code may be used, at least in part, to generate an encryption key that is then used to encrypt communication between program 112 and internet access device 120. Making the connection between program 112 and Internet access device 120 secure may prevent malicious code within device 110 from interfering with the connection to conceal the presence of MITM element 116. An alphanumeric code of thirty-two 8-bit characters corresponds to a length of 128 bits, for example.

Thus in the system of FIG. 1, program 112 has a first interface, which traverses first transceiver 114, with correspondent node 140 and program 112 has a second interface, which traverses second transceiver 118, with Internet access device 120.

Figure 2:
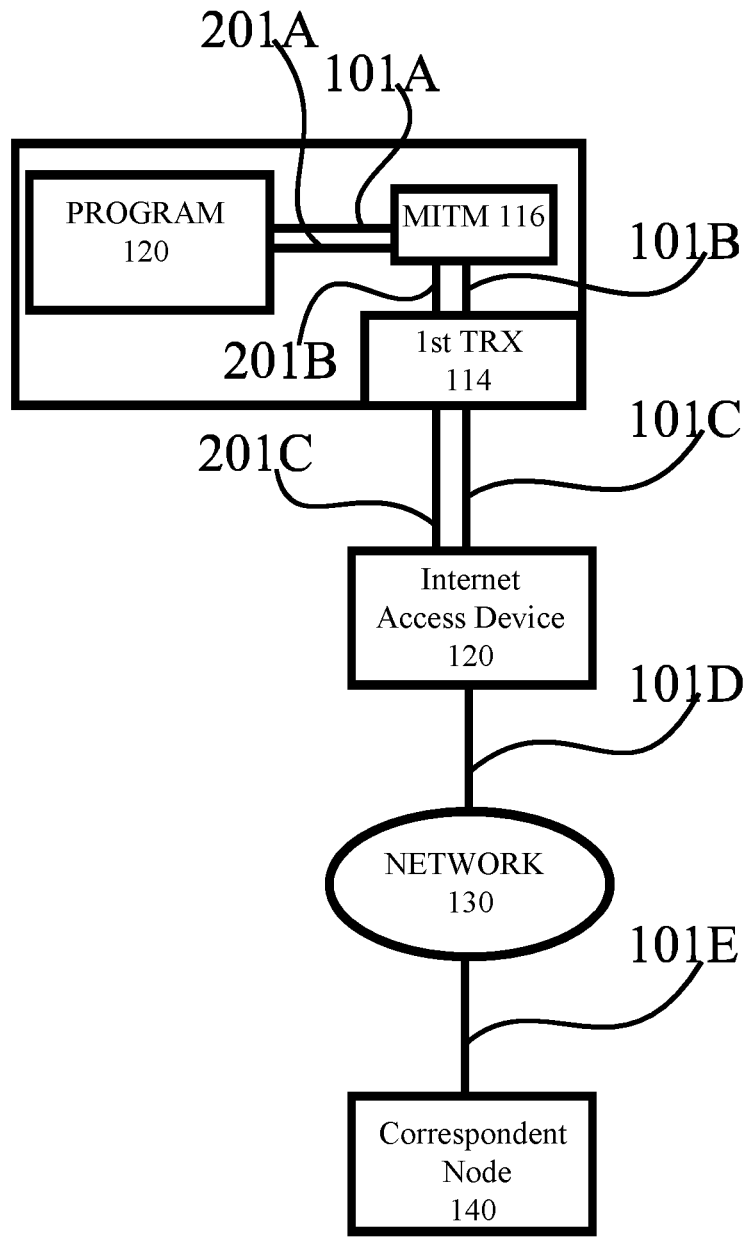
FIG. 2 illustrates a second system in accordance with at least some embodiments of the present invention.

FIG. 2 illustrates a second system in accordance with at least some embodiments of the present invention. The system of FIG. 2 shares elements with that of FIG. 1, and like numbering denotes like structure as in FIG. 1. Unlike in FIG. 1, in FIG. 2 both the first interface and the second interface traverse first transceiver 114. In detail, the second interface comprises communication legs 201A, 201B and 201C. The second interface may comprise a packet connection, such as for example an IP connection, where internet access device 120 is an endpoint of the packet connection. Since the second interface traverses the first transceiver, the second interface may also traverse MITM element 116. Although second transceiver 118 is not illustrated in FIG. 2, its presence is not excluded in embodiments arranged to function as described herein in connection with FIG. 2.

Since the second interface in the embodiments of FIG. 2 may traverse MITM entity 116, the second interface may be secured with a code, as discussed above in connection with FIG. 1. Program 112 may signal to internet access device 120 to alert internet access device 120 that program 120 intends to establish a secured packet connection, after which internet access device 120 may transmit a copy of the cryptographic certificate of correspondent node 140 to program 112 via the second interface, encrypted with the code or a shared secret derived from the code. Since MITM entity 116 does not know the code, it cannot tamper with the second interface, in detail, it cannot encrypt the forged certificate it creates with the code, since it doesn't know the code.

In some embodiments the second interface, although traversing MITM entity 116, may nonetheless be unsecured with a code. This may work, since MITM entity 116 may not be configured to react to messaging exchanged between program 112 and internet access device 120, in case MITM entity 116 is only configured to intercept an establishment procedure, such as a handshake, of a specific cryptographic protocol.

Overall, both in the FIG. 1 and FIG. 1 embodiments, internet access device 120 may provide, over the second interface, to program 112 a copy of the certificate, or more generally information concerning the certificate. Information concerning the certificate may comprise a copy of the certificate itself, a hash of at least part of the certificate, or an identity of a signing authority that has signed the certificate, for example, or a combination thereof. Likewise in the FIG. 1 or FIG. 2 embodiments, responsive to a mismatch between the certificate received over the first interface and the information concerning the certificate received over the second interface, program 112 may be configured to establish the secured protocol connection over the second interface. This may comprise restarting the establishment of the secured protocol connection, or completing the already started establishment of the secured protocol connection by transmitting a response to the certificate via the second interface. Likewise, in both the FIG. 1 and FIG. 1 embodiments, entity 120 may comprise more generally a network access device, of which an internet access device is an example. However, the principles of the invention are applicable also in embodiments where the internet is not used. Network access device 120 may be external to device 110.

Figure 3:
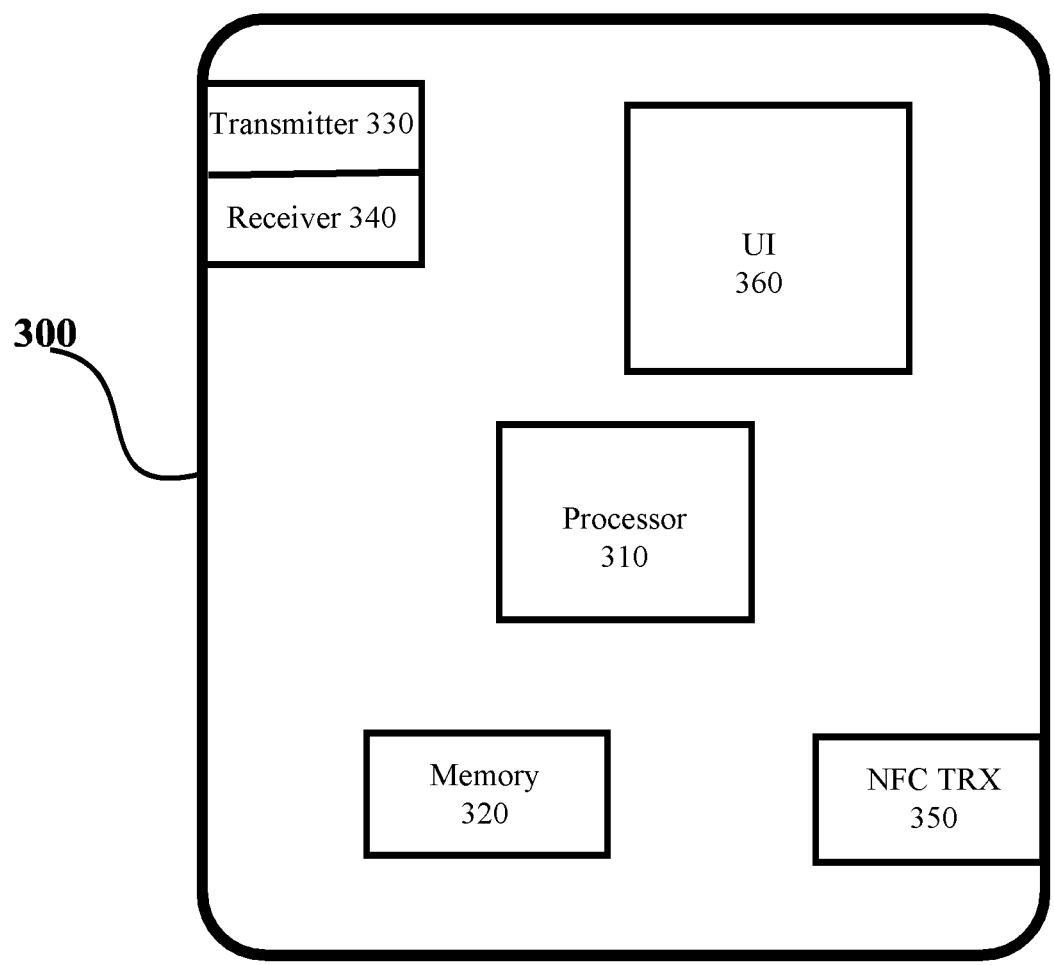
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, device 110 of FIG. 1 or FIG. 2. Comprised in device 300 is processor 310, which may comprise, for example, a single- or multi-core processor wherein a single-core processor comprises one processing core and a multi-core processor comprises more than one processing core. Processor 310 may comprise more than one processor. A processing core may comprise, for example, a Cortex-A8 processing core manufactured by ARM Holdings or a Steamroller processing core produced by Advanced Micro Devices Corporation. Processor 310 may comprise at least one Qualcomm Snapdragon and/or Intel Core processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. A combination of transmitter and receiver may be referred to as a transceiver. Transmitter 330 and/or receiver 340 may be configured to operate in accordance with global system for mobile communication, GSM, wideband code division multiple access, WCDMA, long term evolution, LTE, IS-95, wireless local area network, WLAN, Ethernet and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to browse the internet or to handle networked banking Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350.

Processor 310, memory 320, transmitter 330, receiver 340, NFC transceiver 350 and/or UI 360 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
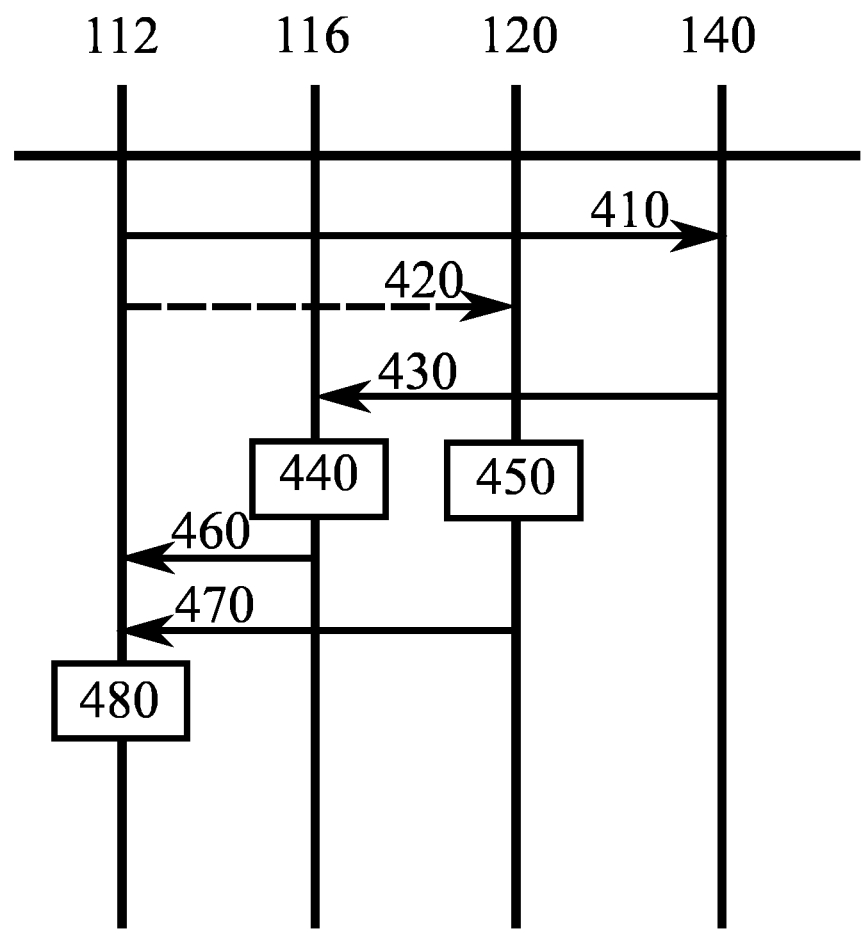
FIG. 4 illustrates signalling in accordance with at least some embodiments of the present invention.

FIG. 4 illustrates signalling in accordance with at least some embodiments of the present invention. On the vertical axes are disposed, from left to right, in terms of FIG. 1 and/or FIG. 2, program 112, MITM entity 116, internet access device 120, and, finally, correspondent node 140. In the figure, time advances from the top toward the bottom.

In phase 410, program 112 may initiate a connection with correspondent node 140, such as for example a secured protocol connection. Initiating the connection may comprise triggering an establishment procedure of the connection. Phase 410 may take place over the first interface. In optional phase 420, program 112 may alert internet access device 120, for example over the first interface or the second interface, that a secure protocol connection will be established over the first interface. As a response, internet access device 120 may begin monitoring for incoming cryptographic certificates. Where present, phase 420 may take place before or after phase 410. Where phase 420 is absent, internet access device 120 may continually monitor for incoming cryptographic certificates.

In phase 430, correspondent node 140 transmits its cryptographic certificate toward program 112, wherein program 112 would receive the cryptographic certificate over the first interface but MITM entity 116 is configured to intercept this message, preventing program 112 from receiving it. Responsively, in phase 440 MITM entity 440 generates a forged certificate, which MITM entity 116 signs using a private key. In phase 460 MITM entity 116 provides the forged certificate to program 112 as an apparent message from correspondent node 140.

In phase 450, internet access device 120 detects that the cryptographic certificate of correspondent node 140 traverses internet access device 120 in phase 430 on its way toward device 110, in which program 112 is running Internet access device 120 stores a copy of the cryptographic certificate, and in phase 470 internet access device 120 transmits, over the second interface, to program 112 information concerning the cryptographic certificate, which, as noted above, may comprise the cryptographic certificate itself, for example.

In phase 480, program 112 may compare the certificate received in phase 460, over the first interface, to the information concerning the certificate, received in phase 470 over the second interface. Depending on an outcome of this comparison, program 112 may abort establishment of the secured protocol connection, complete establishment of the secured protocol connection over the first interface, complete establishment of the secured protocol connection over the second interface or alert the user, for example, as described above.

Figure 5:
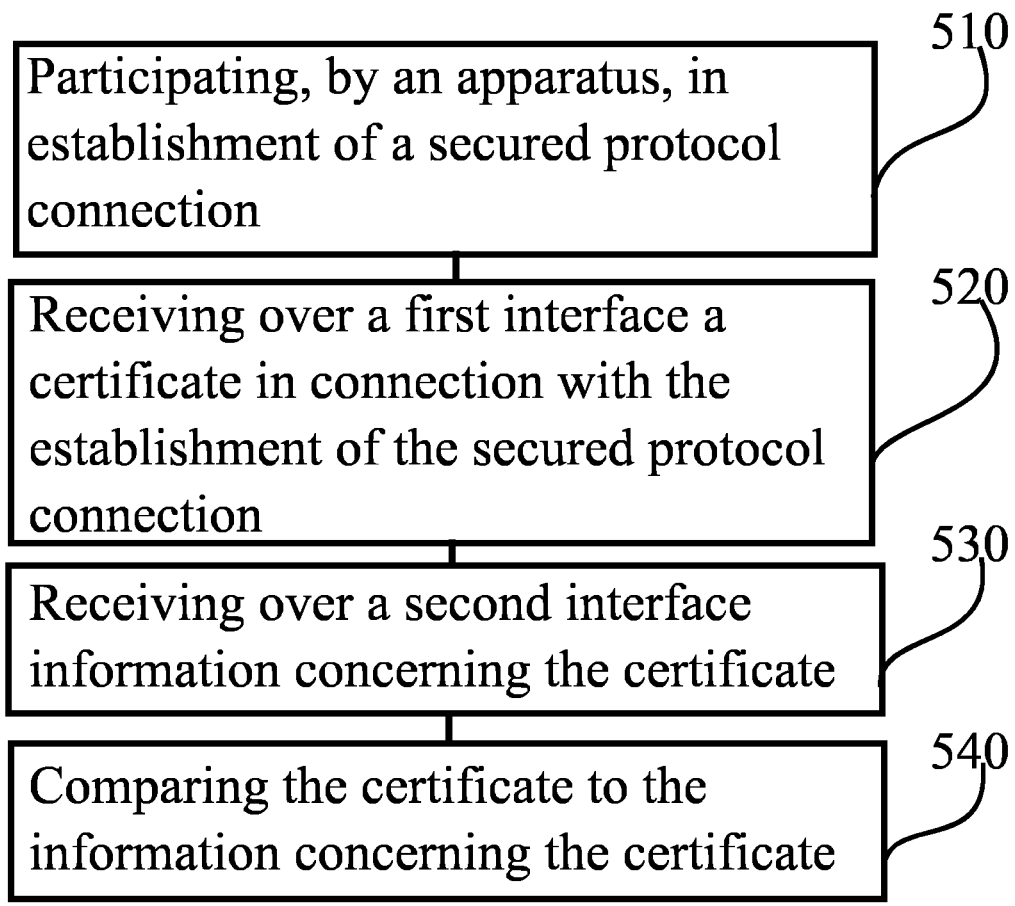
FIG. 5 is a first flow graph in accordance with at least some embodiments of the present invention.

FIG. 5 is a first flow graph in accordance with at least some embodiments of the present invention. The phases of the illustrated method may be performed in device 110, for example, or in a control device configured to control the functioning of device 110, when implanted therein.

Phase 510 comprises participating, by an apparatus, in establishment of a secured protocol connection. The apparatus may comprise device 110, for example. Phase 520 comprises receiving over a first interface a certificate in connection with the establishment of the secured protocol connection. Phase 530 comprises receiving over a second interface information concerning the certificate. The receiving of phase 530 may take place in connection with the establishment of the secured protocol connection. For example, the receiving may take place during the establishment of the secured protocol connection, which may comprise the receiving taking place during a handshaking procedure establishing the secured protocol connection. The method may comprise delaying the completion of the establishment of the secured protocol connection to wait for the reception of the information concerning the certificate. Finally, phase 540 comprises comparing the certificate to the information concerning the certificate. Participating in establishment of a secured protocol connection may comprise, for example, performing the role of client or server in a handshake procedure of the secured protocol connection, such as, for example, a TLS handshake.

Figure 6:
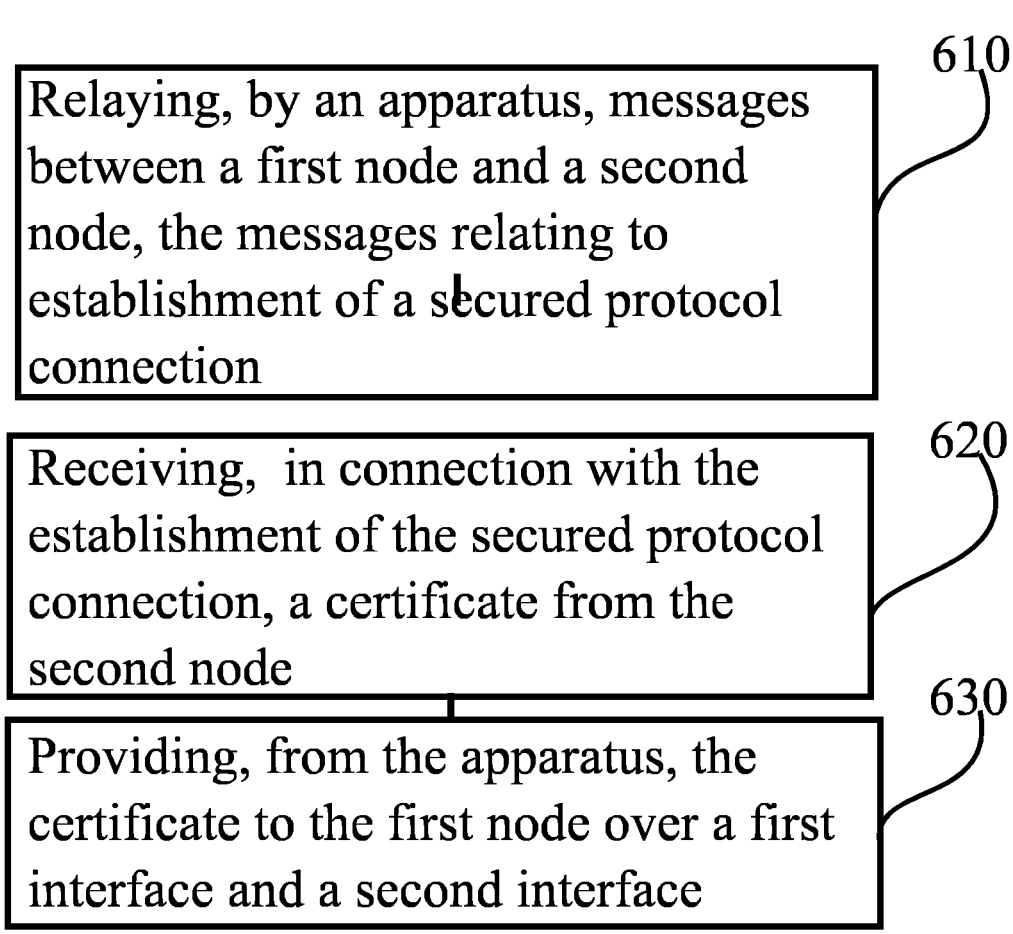
FIG. 6 is a second flow graph in accordance with at least some embodiments of the present invention.

FIG. 6 is a second flow graph in accordance with at least some embodiments of the present invention. The phases of the illustrated method may be performed in internet access device 120, for example, or in a control device configured to control the functioning of internet access device 120, when implanted therein.

Phase 610 comprises relaying, by an apparatus, messages between a first node and a second node, the messages relating to establishment of a secured protocol connection. The apparatus may comprise internet or network access device 120, for example. Phase 620 comprises receiving, in connection with the establishment of the secured protocol connection, a certificate from the second node. Finally, phase 630 comprises providing, from the apparatus, the certificate to the first node over a first interface and over a second interface.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in increasing communication security.

ACRONYMS LIST

IETF Internet Engineering Task Force
IP Internet protocol
MITM man-in-the middle attack
Wi-Fi wireless local area network
WLAN wireless local area network
SSL secure sockets layer
TLS transport layer security

REFERENCE SIGNS LIST

| | |
|---|---|
| 101A-E | Connection between program 112 and correspondent node 140 |
| 102 | Connection between internet access device and second transceiver |
| 110 | Device |
| 112 | Program |
| 114 | First transceiver |
| 116 | MITM entity |
| 118 | Second transceiver |
| 120 | internet access device, more generally network access device |
| 130 | Network |
| 140 | Correspondent node |
| 201A-C | Second interface in the FIG. 2 embodiment |
| 300-360 | Structure of FIG. 3 device |
| 410-480 | Phases of FIG. 4 method |
| 510-540 | Phases of FIG. 5 method |
| 610-640 | Phases of FIG. 6 method |

The invention claimed is:

1. An apparatus comprising, at least one processor, and at least one memory including computer program code, the at least one memory and the computer program code configured to, with the at least one processor, cause the apparatus at least to:
receive over a first interface a certificate from a correspondent node during establishment of a secured protocol connection between the apparatus and the correspondent node;
receive, during the establishment of the secured protocol connection, over a second interface, information concerning the certificate, and
compare the certificate to the information concerning the certificate, wherein the apparatus is configured to receive the certificate and the information concerning the certificate via a network access node which is external to both the apparatus and the correspondent node,
wherein, responsive to the information concerning the certificate being determined to be inconsistent with the certificate, the apparatus is configured to at least one of: participate in establishing the secured protocol connection over the second interface, alert the user and abort the establishment of the secured protocol connection.

2. The apparatus according to claim 1, wherein the at least one memory and the computer program code are configured to, with the at least one processor, cause the apparatus to participate in the establishment of the secured protocol connection by receiving and transmitting messages over the first interface.

3. The apparatus according to claim 1, wherein the first interface comprises an internet protocol connection with the correspondent node, the first interface caused to traverse a first transceiver.

4. The apparatus according to claim 1, wherein the second interface comprises a connection with the network access node, the second interface caused to traverse a second transceiver.

5. The apparatus according to claim 1, wherein the second interface comprises a packet based connection with the network access node, the second interface caused to traverse the first transceiver.

6. The apparatus according to claim 1, wherein the secured protocol connection comprises a transport layer security connection.

7. The apparatus according to claim 1, wherein the at least one memory and the computer program code are configured to, with the at least one processor, cause the apparatus to verify a cryptographic signature of at least one of the certificate and the information concerning the certificate.

8. The apparatus according to claim 1, wherein the apparatus is configured to complete the establishment of the secured protocol connection at least in part as a response to a determination that the information concerning the certificate is consistent with the certificate.

9. A method comprising:
receiving, by an apparatus, over a first interface, from a correspondent node, a certificate during establishment of a secured protocol connection between the apparatus and the correspondent node;
receiving, during the establishment of the secured protocol connection, over a second interface, information concerning the certificate, and
comparing the certificate to the information concerning the certificate, wherein the method comprises receiving the certificate and the information concerning the certificate via a network access node external to both the apparatus and to the correspondent node,
wherein, responsive to the information concerning the certificate being determined to be inconsistent with the certificate, the apparatus is configured to at least one of: participate in establishing the secured protocol connection over the second interface, alert the user and abort the establishment of the secured protocol connection.

10. The method according to claim 9, wherein participating in the establishment of the secured protocol connection comprises receiving and transmitting messages over the first interface.

11. The method according to claim 9, wherein the first interface comprises an internet protocol connection with a correspondent node, the first interface traversing a first transceiver, the secured protocol connection being established between the apparatus and the correspondent node.

12. The method according to claim 9, wherein the second interface comprises a connection with a network access device, the second interface traversing a second transceiver.

13. The method according to claim 9, wherein the second interface comprises a packet based connection with a network access device, the second interface traversing the first transceiver.

14. A non-transitory computer readable medium having stored thereon a set of computer readable instructions that, when executed by at least one processor, cause an apparatus to at least:
receive over a first interface, from a correspondent node, a certificate during establishment of a secured protocol connection between the apparatus and the correspondent node;

receive during the establishment of the secured protocol connection, over a second interface, information concerning the certificate, and compare the certificate to the information concerning the certificate, wherein the certificate and the information concerning the certificate are received via a network access node external to both the apparatus and to the correspondent node, wherein, responsive to the information concerning the certificate being determined to be inconsistent with the certificate, the apparatus is configured to at least one of: participate in establishing the secured protocol connection over the second interface, alert the user and abort the establishment of the secured protocol connection.

* * * * *